United States Patent
Rocheblave et al.

(10) Patent No.: US 7,338,115 B2
(45) Date of Patent: Mar. 4, 2008

(54) MOTOR VEHICLE REAR FLOOR

(75) Inventors: Laurent Rocheblave, Villeurbanne (FR); Gerald Andre, Amberieu En Bugey (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 11/411,861

(22) Filed: Apr. 27, 2006

(65) Prior Publication Data

US 2007/0096508 A1    May 3, 2007

(30) Foreign Application Priority Data

Apr. 27, 2005   (FR)   ................................. 05 04258

(51) Int. Cl.
*B62D 25/08*   (2006.01)
(52) U.S. Cl. ........................ 296/193.07; 296/193.08; 296/187.11; 296/37.2
(58) Field of Classification Search .......... 296/187.11, 296/193.08, 37.2, 37.3
See application file for complete search history.

(56) References Cited

U.S. PATENT DOCUMENTS

| | | | |
|---|---|---|---|
| 5,954,246 A | * | 9/1999 | Golovoy et al. ......... 224/42.23 |
| 7,032,961 B2 | * | 4/2006 | Matsuda ..................... 296/204 |
| 7,090,290 B2 | * | 8/2006 | Neumeier et al. .......... 296/204 |
| 2003/0173799 A1 | * | 9/2003 | Wendland et al. ..... 296/187.01 |
| 2004/0080188 A1 | * | 4/2004 | Igarashi et al. ........ 296/203.04 |

* cited by examiner

*Primary Examiner*—Joseph D. Pape
(74) *Attorney, Agent, or Firm*—Oliff & Berridge, PLC

(57) ABSTRACT

The present invention relates to a motor vehicle rear floor (32) that is intended to form part of a motor vehicle rear block, the block including two longitudinal rails (12), each having a front end forming a rear structural node (20) of the vehicle and a rear end (14), the rear ends being arranged to serve as bearing points for an impact beam (15). The floor further includes reinforcement (22) having at least one rear end (24) arranged to serve as a bearing point for the impact beam (15), and two limbs (22a, 22b) each intended to extend in a straight line from the rear end (24) of the reinforcement to one of the nodes (20).

16 Claims, 3 Drawing Sheets

US 7,338,115 B2

MOTOR VEHICLE REAR FLOOR

CROSS-REFERENCE TO RELATED APPLICATIONS

This application claims the benefit of French Patent Application No. 0504258, filed Apr. 27, 2005, the disclosure of which is hereby incorporated by reference herein in its entirety.

BACKGROUND OF THE INVENTION

The present invention relates to a rear block, a rear floor, and reinforcement for a motor vehicle.

More precisely, the invention lies in the field of protecting the rear ends of vehicles against high speed impacts.

In the present application, the chassis 100 of a vehicle is defined as a rigid structure, as can be seen in FIG. 0 which is a diagram representing the body of a prior art vehicle, that includes a non-deformable survival cell so as to protect the passengers in the event of an impact. The chassis presents two front longitudinal rails 102 and two rear longitudinal rails 104 providing bearing points for a front impact beam 106 and a rear impact beam 108. The term "underbody" 110 designates the side portions of the chassis in the survival cell, and the term "structural nodes" 112 designates the two intersections of the underbody 110 with the rear longitudinal rails 104.

In the event of a rear impact, a fraction of the energy of the impact is absorbed by deforming the rear block, in particular the beam 108 and the longitudinal rails 104. The remainder of the energy is transmitted in the form of kinetic energy to the chassis 100, which does not deform and thus preserves the passengers. The nodes 112 are designed to take up the forces received by the longitudinal rails from behind and to transmit them to the chassis. The nodes 112 may also be situated at the intersections between a cross-member 114 and the longitudinal rails, and may constitute the interface with the rear axle for transmitting vertical or transverse forces stemming from contact with the road. Consequently, the nodes 112 constitute very rigid connections, particularly since the bonding between these parts is generally performed by welding, thereby contributing to providing stiffness. By definition, the nodes do not have an energy-absorbing function, and they are considered as being non-deformable for impacts up to 80 kilometers per hour (km/h).

Such a structure is not fully satisfactory in the event of a high-speed impact against only part of the rear end of the vehicle, for two reasons. Firstly, when the point of impact is situated on one side of the rear end of the vehicle, only one of the two longitudinal rails is under stress to resist the impact, even though the impact is particularly violent and the rail needs to provide maximum resistance. Secondly, when the point of impact is situated between the two longitudinal rails, the impact beam 108 is highly stressed in bending and might break.

One means is already known in the prior art for responding to those drawbacks, namely providing a third longitudinal rail between the other two. This third longitudinal rail extends between the impact beam 108 and the opposite cross-member 114. It thus enables energy due to an impact to be absorbed better by forming a third bearing point for the beam.

However, when the impact covers only a portion of the rear end of the vehicle, the force is transmitted to the chassis, and more precisely to the underbody 110, via the cross-member, such that the total force that can be accepted by the rear block is limited by the bending strength of the cross-member 114. In addition, the third longitudinal rail runs the risk of penetrating into the survival cell or into the fuel tank.

BRIEF SUMMARY OF THE INVENTION

The present invention seeks to solve those drawbacks by proposing a rear block that provides great resistance to impacts, even in the event of an impact covering only part of the rear end.

To this end, the invention provides a motor vehicle rear block, said block comprising reinforcement and two longitudinal rails, the reinforcement and each of the longitudinal rails presenting at least one respective rear end, said rear ends being arranged to act as bearing points for an impact beam, each of the longitudinal rails further comprising a front end forming a rear structural node of the vehicle, the block being characterized in that the reinforcement comprises two limbs, each extending in a straight line from a rear end of said reinforcement to a respective one of the nodes.

The term "limbs each extending from a rear end of said reinforcement to a respective one of the nodes" is used to meant that the ends of the reinforcement that are connected directly or indirectly to the beam and to the nodes are suitable for receiving and transmitting forces received by the beam to the chassis, and more precisely to the vehicle underbody.

The reinforcement is thus configured in such a manner as to bear against the nodes in order to absorb the energy of a high-speed impact, and transmit to the nodes the forces to which the beam is subjected, in particular during a low-speed impact.

By means of the invention, any force received by the rear end of the reinforcement is directly transmitted diagonally, in other words in a straight line, to each of the two nodes, and thus to the underbody, such that each of the two nodes contributes to taking up the force associated with an impact against part of the rear end of the vehicle, without this contribution depending on the bending strength of a cross-member interconnecting the two nodes. The underbody situated on the side opposite from the impact is thus caused to contribute more in increasing the force transmitted to the chassis, thereby absorbing energy better by deforming the rear block and thus reducing penetration of the obstacle into the block, which is particularly advantageous for impacts at high speed, i.e. above 50 km/h. The occupants of the vehicle are thus better protected and the fuel system remains intact.

Consequently, with such a rear block, it is possible, while retaining the same degree of penetration into the block, to increase the maximum force transmitted to the underbody by 30%, thereby enabling more-violent impacts to be absorbed, but without that increasing the weight of the vehicle by stiffening the underbody.

In addition to absorbing high-speed impacts better, the rear block provides better impact protection at low speed, below 16 km/h. Because of the reinforcement, the beam has at least one bearing point situated between the two longitudinal rails and therefore works more in compression than in bending, so it absorbs impacts more effectively.

In addition, the beam is less likely to break in the event of an impact against a "rear post" thus making it possible to lengthen the beam, and in particular to use a beam made of thermoplastic material.

The reinforcement is preferably a single piece and the two limbs form a V-shape. The reinforcement thus has a single rear end that is substantially central relative to the two longitudinal rails, and that forms a third bearing point for the beam. Nevertheless, it is possible to envisage the two limbs being separate, with the reinforcement then including two rear ends arranged on either side of the center of the impact beam.

In a preferred embodiment of the invention, the rear block includes a cross-member interconnecting the two nodes. Because the reinforcement of the invention is in the form of two diagonals, the cross-member works in traction only during an impact and serves to keep the spacing between the two longitudinal rails constant.

For greater effectiveness, the reinforcement is preferably arranged in the same horizontal plane as the longitudinal rails.

In an embodiment, the rear block contains a spare wheel and the reinforcement is arranged over the spare wheel. It is also possible for the rear end of the reinforcement to include means for fastening it releasably to the vehicle and for its front ends to include means for enabling the reinforcement to pivot about an axis extending transversely relative to the vehicle. Thus, the pivoting movement enables the reinforcement to be moved and the spare wheel to be extracted.

The reinforcement is optionally made of a composite or hybrid metal/plastics material.

In a particular embodiment of the invention, the rear block includes a low-speed impact absorber arranged between the impact beam and the rear end of the reinforcement.

In an embodiment of the invention, the reinforcement includes anchor means for safety belts, in particular belts for the seats constituting a third row in a vehicle. The reinforcement may also include means for holding a spare wheel horizontally and/or for supporting it vertically.

The invention also provides a motor vehicle rear floor including the above-described rear block reinforcement, i.e. including means for fastening the reinforcement, a housing for receiving the reinforcement, or indeed being made integrally with the reinforcement. Integrating the reinforcement in the floor has the advantage of the mechanical coupling between them giving rise to a rear block that is more stable. It is thus possible for the maximum acceptable force to be made even greater, or else to reduce the weight of the rear block for the same resistance to impacts. In addition, the reinforcement may be formed integrally with the floor.

In a particular embodiment, the floor includes a rear skirt of the vehicle. Thus, the impact beam arranged behind the skirt and the floor bears continuously against the floor and not via a few discrete points so as to distribute force to the floor in uniform manner in order to transmit it to the nodes.

The floor may optionally be adapted to receive reinforcement of various sections or stiffnesses. Thus, it is possible for a floor of standard dimensions to receive reinforcement that is adapted to requirements specific to certain kinds of impact. Since these requirements can differ from one country to another or from one vehicle model to another, it is possible to provide a floor of standard dimensions, and thus of lower cost, while providing impact resistance that is adapted to the vehicle model.

The invention also provides a method of manufacturing such a floor, including a step of integrating reinforcement therein, e.g. by combining the materials making up the floor and the reinforcement.

Finally, the invention provides reinforcement for a rear block as described above.

BRIEF DESCRIPTION OF THE DRAWINGS

The invention can be better understood on reading the following description given purely by way of example and made with reference to the drawings in which similar structural elements may be described with citation to different reference numbers for different embodiments, and in which.

DETAILED DESCRIPTION OF THE INVENTION

Figure 0:
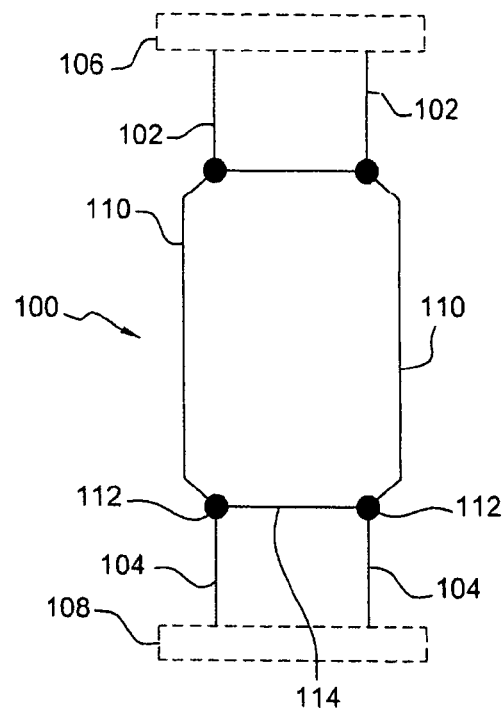
FIG. 0 is a diagram illustrating the body of a prior art vehicle.

In this application, the adjective "front" when applied to a part designates the portion of the part that is directed in the forward travel direction (X) of the vehicle, in contrast to the adjective "rear" that designates the portion of the part that is directed in the opposite direction.

A rear block 10 of the invention comprises two longitudinal rails 12 each having a rear end 14 and a front end 16. The rear ends 14 serve as a support for an impact beam 15.

The front end 16 of the longitudinal rail, more precisely the connection between the end 16 and the underbody 21 of the vehicle, forms a rear structural node 20 of the vehicle. During a rear impact, the structural node 20 constitutes means for transmitting the forces to which the rear longitudinal rails 12 are subjected to the underbody 21. The two structural nodes 20 are interconnected by a front cross-member 18. They can also take up vertical or transverse forces from the vehicle rear axle.

The drawings are described below with citation to reference numbers in the drawings, where different reference numbers may refer to similar structural elements in different embodiments.

Thus, the nodes 20 constitute portions of the vehicle that are very rigid, with rigidity being increased by the various parts being bonded together. This rigidity serves to transfer the forces received during an impact to the underbody 21.

The rear block also includes reinforcement 22 comprising two limbs 22a and 22b forming a V-shape with its point being directed rearwards. The two limbs 22a and 22b extend in straight lines from a rear end 24 of the reinforcement towards two front ends 26 bearing against the longitudinal rails 12, and more precisely against the nodes 20. The reinforcement 22 is arranged in the same horizontal plane as the longitudinal rails.

The rear end 24 forming the point of the V-shape bears against the beam 15 so as to transmit the forces received via the rear end 24 to the nodes 20.

In the event of an impact against an obstacle 28, e.g. a wall overlapping the right-hand side of the rear of the vehicle, the reinforcement absorbs energy by deforming, bearing against the nodes 20, and the end 24 transmits the forces it receives to the underbody. Thus it is not the cross-member 18 that is subjected to bending, but directly the two longitudinal rails including the rail on the side opposite to the impact, i.e. the left longitudinal rail, thereby increasing the force transmitted to the underbody 21. The cross-member 18 works solely in traction to hold the nodes 20 together.

Figure 2:
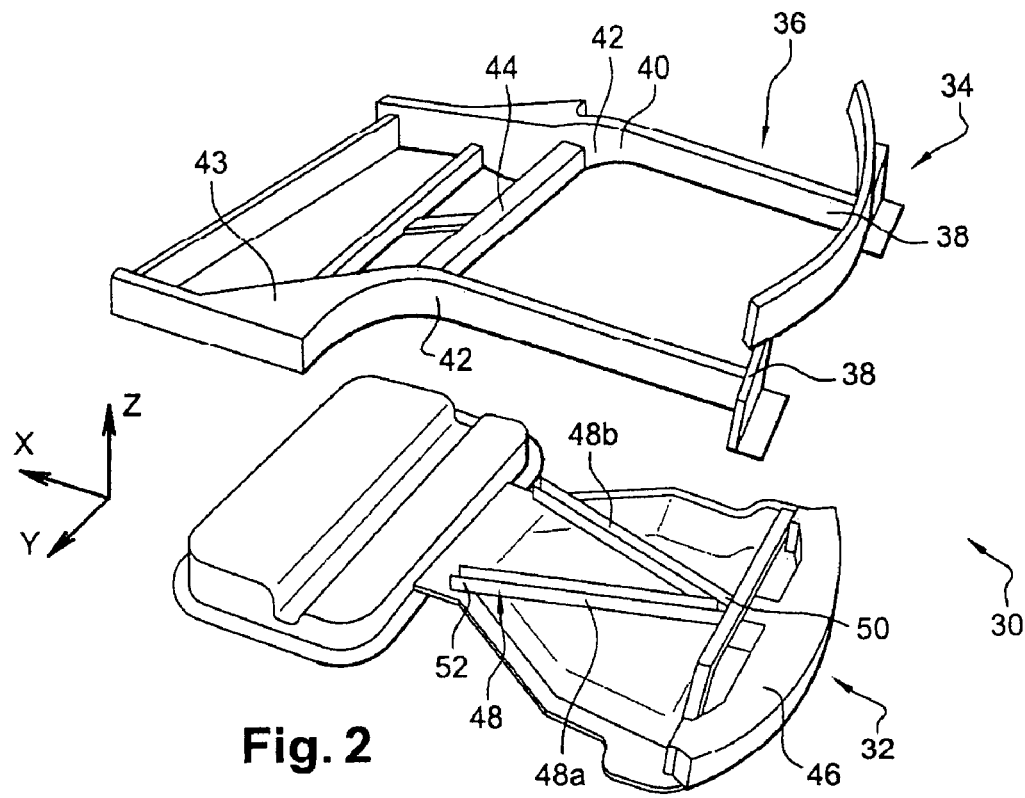
FIG. 2 is an exploded perspective view of a floor according to an embodiment of the invention and of the structure receiving the floor.

As can be seen in FIG. 2, the rear block 30 of the invention includes a structural floor 32 and a rear portion 34 of the vehicle body.

The portion 34 has two longitudinal rails 36, each having a rear end 38, and a front end 40 forming a structural node 42, connecting the longitudinal rail to an underbody 43. The two nodes 42 are connected together by a cross-member 44.

Figure 1:
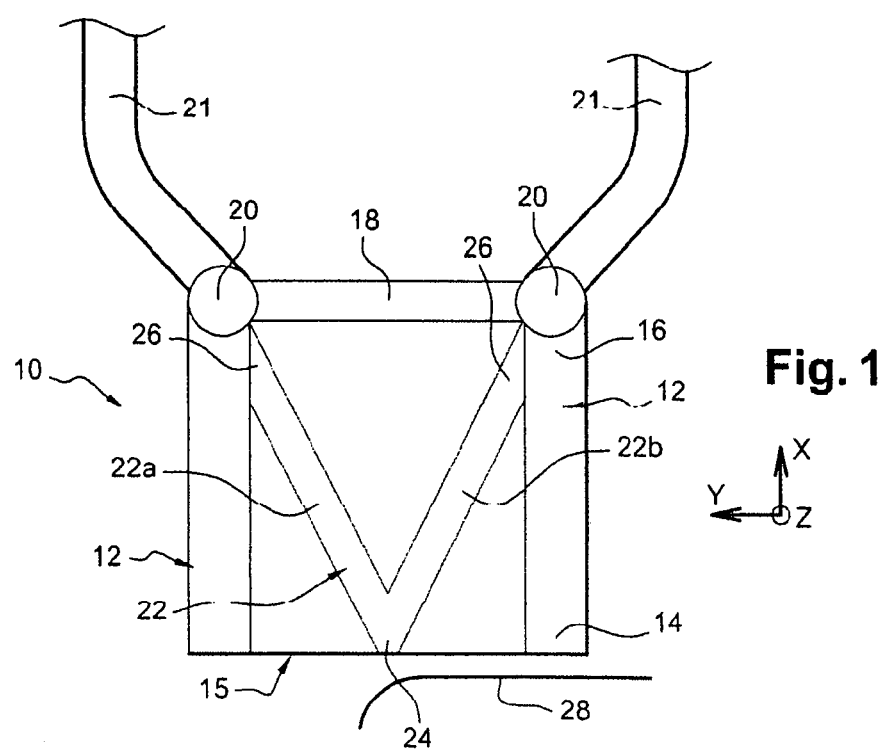
FIG. 1 is a diagram showing the structure of a rear block according to an embodiment of the invention.

The floor 32 is mounted on the vehicle body 34 in the direction Z from below. It comprises an impact beam 46 and reinforcement 48 comprising two limbs 48a and 48b, a rear end 50, and two front ends 52, similar to that shown in FIG. 1. The mechanical coupling between the structural floor 32 and the reinforcement 48 produces a rigid structure.

The reinforcement 48 may be made of steel, of plastics material, or of a composite or hybrid metal/plastics material. It is made in conventional manner, e.g. by forming, stamping, or injection-compression.

Once the floor 32 is mounted on the body 34, the rear end 50 of the reinforcement forms a bearing point for the beam 46 so as to transmit forces towards the ends 52 of the reinforcement, which themselves bear against the front portions 42 of the longitudinal rails. Thus, the energy is absorbed by the beam and the forces are transmitted to the survival cell, in particular to the underbody 43, without passing directly via the cross-member 44.

The reinforcement 48 may also include safety belt anchor means 76, for anchoring safety belt, together with means 78 for retaining or supporting a spare wheel.

In FIG. 2, the reinforcement 48 projects from the floor, but it could be integrated in the thickness of the floor 32, the reinforcement possibly being integral with the remainder of the floor.

In another embodiment, floor 32 includes a rear skirt 80 of the vehicle, while nevertheless forming a module that is fitted to the body.

Figure 3:
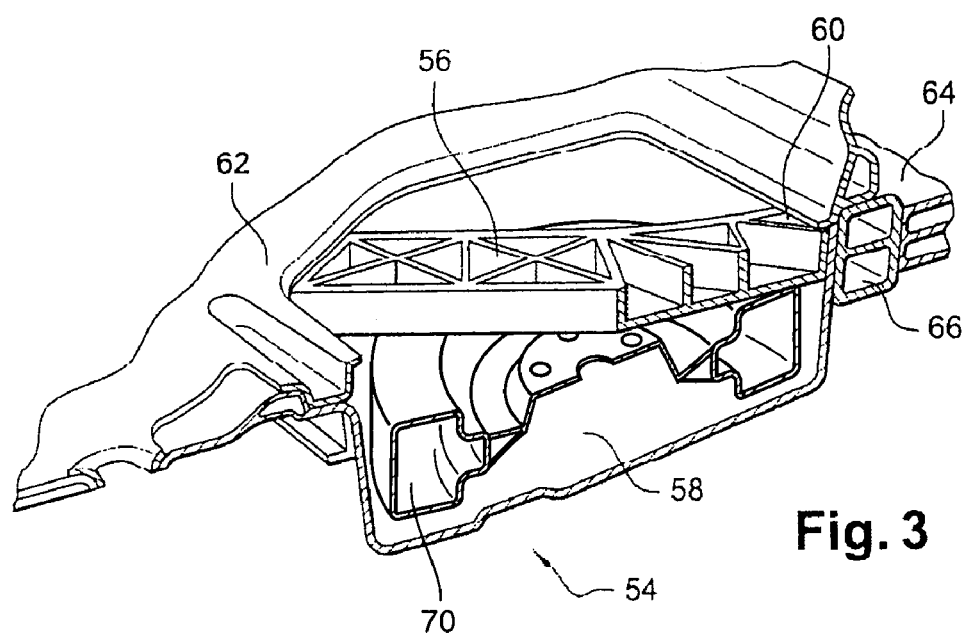
FIG. 3 is a section in perspective on the longitudinal axis of the vehicle showing a portion of a rear block of another embodiment of the invention.
Figure 4:
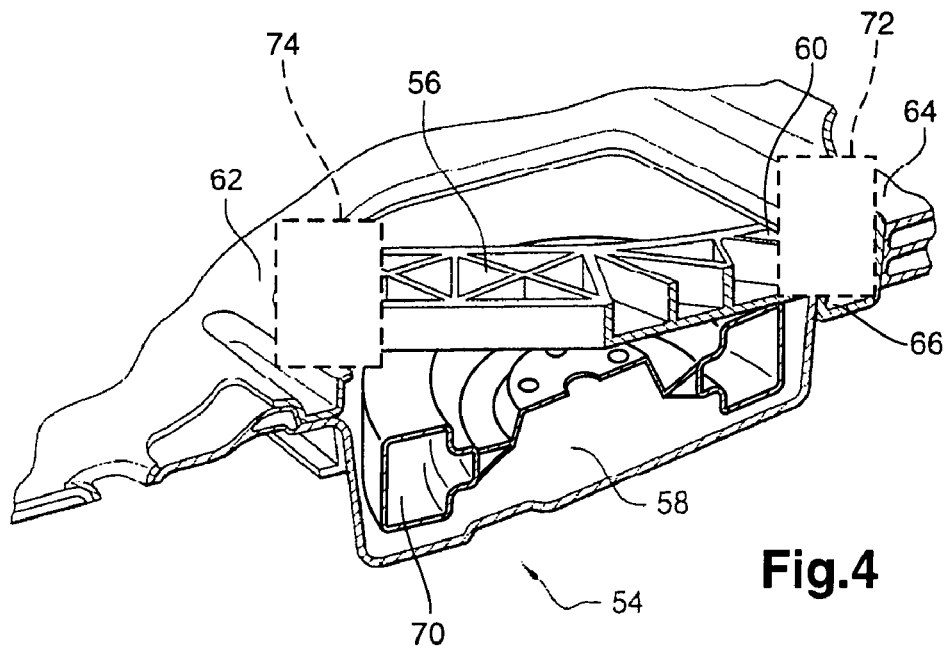
FIG. 4 is a sectional perspective view of a reinforcement mounted on a rear block, including schematic diagrams illustrating a releasable fastener and a pivoting unit.
Figure 5:
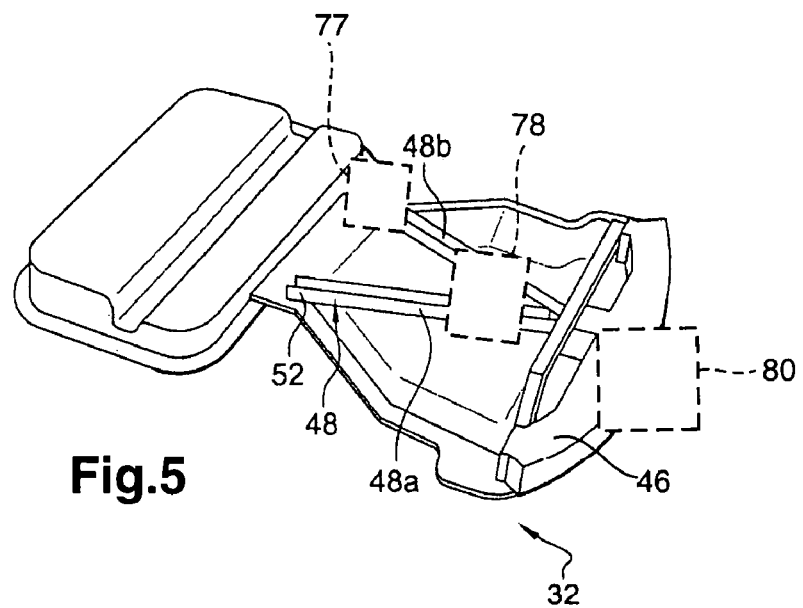
FIG. 5 is perspective view of a floor according to an embodiment of the invention including schematic diagrams illustrating a safety belt anchor, a spare wheel support, and a rear skirt.

As can be seen in FIG. 3, a floor 54 of the invention includes reinforcement 56 similar to that described above provided with stiffening ribs. It also includes a housing 58 for a spare wheel 70, the reinforcement 56 being arranged above the spare wheel when it is present in the housing 58, so that the reinforcement works in a horizontal plane.

The rear end 60 of the reinforcement may include means 72 for releasably fastening it to the remainder of the vehicle (not shown), e.g. in the form of a metal fitting, and the front ends 62 may include means 74 enabling the reinforcement to pivot about an axis extending transversely relative to the vehicle, e.g. via hinges. This makes it possible to detach the rear end 60 of the reinforcement, to pivot the reinforcement, and to gain access to the housing 58 in order to extract the spare wheel. Nevertheless, the hinges and the fitting should be configured in such a way as to ensure that the reinforcement cannot be expelled during an impact.

In addition, the rear end 60 of the reinforcement 56 may form an indirect bearing point for an impact beam 64. An impact absorber 66 is disposed between the beam 64 and the end 60.

In another embodiment, the floor 54 is adapted to receive reinforcement 56 of various sections or stiffnesses. Thus, the floor 54 can be of standard dimensions, and therefore inexpensive, while nevertheless providing an ability to withstand impacts that is adapted to the vehicle model by reinforcement that is specific thereto.

By means of the reinforcement of the invention, the rear block provides a new distribution of the forces generated during an impact covering part of the rear end of the vehicle, in particular during an impact at more than 50 km/h or 80 km/h. The rear block thus provides greater capacity for absorption that does not depend on the bending stiffness of the cross-member interconnecting the nodes. This provides better protection to the passengers and to the fuel system.

In addition, the impact beam has at least three bearing points and therefore works in more uniform manner, and thus more effectively. In terms of appearance, this makes it possible to reduce the distance that needs to be provided between the bumper skin and the longitudinal rails, and thus makes it possible to reduce the rear overhang.

It may be observed that the reinforcement of the invention contributes to absorbing energy and thus deforms for an impact at high speed, while it constitutes stiffening reinforcement that does not deform for impacts at low speed.

Finally, it should be observed that the present invention is not limited to the embodiments described above.

In particular the reinforcement may include means for supporting rear block elements such as one or more batteries, baggage, or accessories.

The invention claimed is:

1. A motor vehicle rear floor subassembly that is configured to be mountable to a motor vehicle rear block,
    wherein the motor vehicle rear block comprises two longitudinal rails, each having a front end forming a rear structural node of the vehicle and a rear end, said rear ends being arranged to serve as bearing points for an impact beam,
    wherein the rear floor subassembly comprises reinforcement having at least one rear end arranged to serve as a bearing point for the impact beam, at least one front end, and two limbs,
    wherein each limb is configured to extend in a straight line from the at least one rear end of said reinforcement to a respective one of the nodes of the motor vehicle rear block when the floor subassembly is mounted on the rear block.

2. A floor subassembly according to claim 1, in which the two limbs form a V-shape.

3. A motor vehicle rear block mounted with a floor subassembly according to claim 1, and further including a cross-member interconnecting the two nodes.

4. A floor subassembly according to claim 1, in which the reinforcement is shaped to be arranged in the same horizontal plane as the longitudinal rails.

5. A motor vehicle rear block mounted with a floor subassembly according to claim 1, and containing a spare wheel, wherein the reinforcement is arranged over the spare wheel.

6. A floor subassembly according to claim 1, in which at least one rear end of the reinforcement includes a releasable fastener, fastening it to the vehicle and in which at least one front end of the reinforcement includes a pivoting unit for allowing the reinforcement to pivot about an axis extending transversely relative to the vehicle.

7. A floor subassembly according to claim 1, in which the reinforcement is made of a composite or hybrid metal/plastics material.

8. A motor vehicle rear block mounted with a floor subassembly according to claim 1, and further including an impact absorber arranged between the impact beam and the rear end of the reinforcement.

9. A floor subassembly according to claim 1, in which the reinforcement includes a safety belt anchor.

10. A floor subassembly according to claim 1, in which the reinforcement includes a spare wheel retainer or spare wheel support.

11. A rear floor subassembly according to claim 1, made integrally with the reinforcement.

12. A rear floor subassembly according to claim 1, including a rear skirt of the vehicle.

13. A rear floor subassembly according to claim 1, adapted to receive reinforcement having different sections or stiffnesses.

14. A method of manufacturing a rear floor subassembly according to claim 1, including a step of mounting the reinforcement in the floor.

15. A motor vehicle rear floor subassembly that is configured to be mountable to a motor vehicle rear block,
   wherein the rear floor subassembly is formed as an integral unit prior to being mounted on said motor vehicle rear block, and wherein the subassembly comprises reinforcement having at least one rear end arranged to serve as a bearing point for an impact beam, at least one front end, and two limbs; and
   wherein the motor vehicle rear block comprises two longitudinal rails, each having a front end forming a rear structural node of the vehicle and a rear end, said rear ends being arranged to serve as bearing points for an impact beam,
   and wherein each limb of the subassembly is configured to extend in a straight line from the at least one rear end of said reinforcement to a respective one of the nodes of the motor vehicle rear block when the floor subassembly is mounted on the rear block.

16. A method of constructing a motor vehicle rear block mounted with a rear floor subassembly unit, wherein the method comprises:
   constructing the rear floor subassembly unit including a reinforcement having at least one rear end arranged to serve as a bearing point for an impact beam, at least one front end, and two limbs; and
   mounting the rear floor subassembly unit on a motor vehicle rear block that comprises two longitudinal rails, each having a front end forming a rear structural node of the vehicle and a rear end, said rear ends being arranged to serve as bearing points for the impact beam,
   wherein each limb extends in a straight line from the at least one rear end of said reinforcement to a respective one of the nodes of the motor vehicle rear block when the floor subassembly is mounted on the rear block.

* * * * *